United States Patent [19]

Lo

[11] Patent Number: 4,844,583
[45] Date of Patent: Jul. 4, 1989

[54] PHOTOGRAPHIC IMAGING SYSTEM FOR USE IN PRODUCING STEREOGRAPHS

[76] Inventor: Anthony Lo, 62 Conduit Road, Hong Kong, Hong Kong

[21] Appl. No.: 5,889

[22] Filed: Jan. 22, 1987

[30] Foreign Application Priority Data

Jan. 24, 1986 [GB] United Kingdom ............. 8601687

[51] Int. Cl.⁴ .................... G02B 27/22; G03B 35/08
[52] U.S. Cl. .................................. 350/132; 354/112; 354/114
[58] Field of Search ............. 350/171, 132; 354/112, 354/114, 117, 94

[56] References Cited

U.S. PATENT DOCUMENTS

| | | | |
|---|---|---|---|
| 1,657,270 | 1/1928 | Muller et al. | 350/132 |
| 2,413,996 | 1/1947 | Ramsdell | 354/117 |
| 2,736,250 | 2/1956 | Papritiz | 354/117 |
| 2,922,350 | 1/1960 | Fischer et al. | 354/112 |
| 3,608,458 | 9/1971 | Ratliff | 354/114 |
| 4,009,951 | 3/1977 | Ihms | 350/132 |

*Primary Examiner*—Bruce Y. Arnold
*Assistant Examiner*—Jay Patrick Ryan
*Attorney, Agent, or Firm*—Finnegan, Henderson, Farabow, Garrett and Dunner

[57] ABSTRACT

A photographic imaging system for use in a stereoscopic camera or in a conventional camera for producing stereographs, comprising a beam splitter having two pairs of reflective surfaces each pair of reflective surfaces being disposed so as to direct an image through lenses so that two images are projected side-by-side onto a film, the film after being processed producing two prints or slides disposed side-by-side which can be viewed through a viewer to give a stereoscopic reproduction of the object photographed.

7 Claims, 2 Drawing Sheets

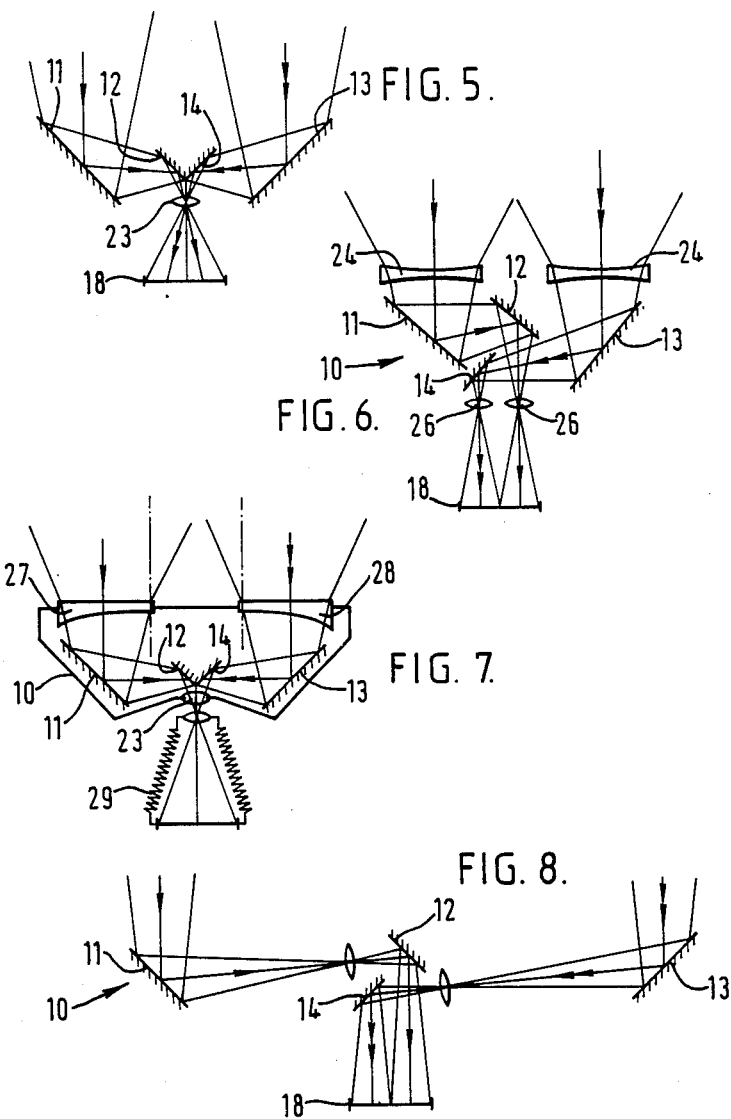

PHOTOGRAPHIC IMAGING SYSTEM FOR USE IN PRODUCING STEREOGRAPHS

SUMMARY OF THE INVENTION

This invention relates to a photographic imaging system, for use in a stereoscopic camera or in a conventional camera, for producing stereographs.

A conventional stereoscopic camera is designed to give two displaced images by means of two matched lenses and shutters, so that the images, when viewed with the separate eyes, give a stereoscopic reproduction of the object photographed. The two lenses are set apart by about the same distance as the eyes of a human. There are two kinds of stereoscopic cameras, one uses two camera lenses as stated above, in which case normal or wide angle pictures can be taken but the photographs from such a camera must be accurately aligned and mounted for viewing, and the second type uses a beam splitter, but in this case the angle of view is restricted, although the pairs of photographs are ready for viewing without the need for re-mounting.

The present invention provides an imaging system which has a normal or wide angle view and the negatives or slides are processed in the normal way and the results are ready for viewing without aligning or re-mounting.

According to the present invention there is provided a photographic camera imaging system for use in a stereoscopic camera or in a conventional camera for producing stereographs, comprising a beam splitter having two pairs of reflective surfaces, each pair being disposed so as to direct an image through a lens so that two images are projected side-by-side onto a light sensitive recording medium.

BRIEF DESCRIPTION OF THE DRAWINGS

To the accomplishment of the foregoing and related ends, the invention then comprises the features fully hereinafter described and particularly point out in the claims, the following description and annexed drawings setting forth in detail some illustrative embodiments of the invention, their being indicative however of only some ways in which the principle of the invention may be employed.

In said annexed drawings:

FIG. 5 shows the beam splitter with a single lens, FIG. 6 shows retro-focus lenses combined with the beam splitter, FIG. 7 shows an attachment for use with a conventional camera, and FIG. 8 shows telescopic lenses combined with the beam splitter.

DESCRIPTION OF THE PREFERRED EMBODIMENTS

Figure 1:
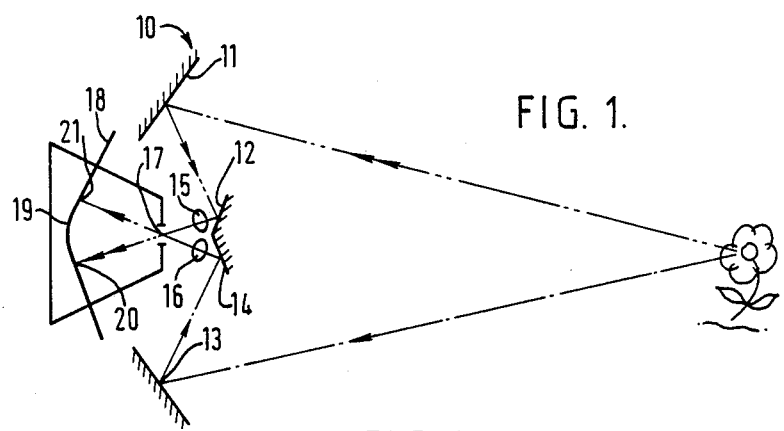
FIG. 1 is a diagramatic plan view of an imaging system according to the present invention.

In FIG. 1 there is diagrammatically illustrated an imaging system for a stereoscopic camera comprising a beam splitter unit 10 having two pairs of reflective surfaces 11, 12 and 13, 14. Each pair of reflective surfaces 11, 12 and 13, 14 are disposed so as to direct an image through one of a pair of lenses 15 and 16. A simple shutter 17 is provided behind the lenses 15, 16 and the film 18 is positioned on a curved or angled film support surface 19.

Figure 2:
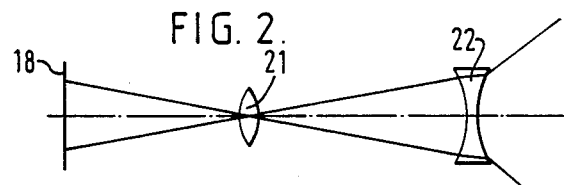
FIG. 2 shows the principle of a retro-focus lens.
Figure 3:
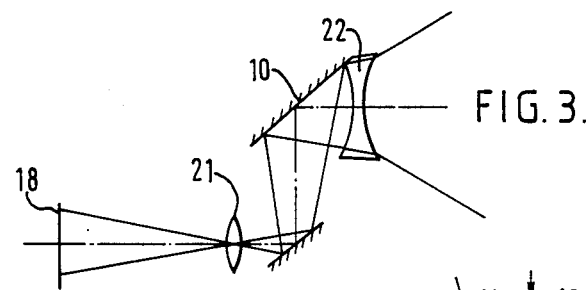
FIG. 3 shows the use of a retro-focus lens with a half beam splitter.

The light paths are indicated by the broken lines provided with arrows and it will be seen that the image received by the pair of reflective surfaces 11, 12 is projected through the lens 15 and through the aperture controlled by the shutter 17 onto the film 18 at position 20, and the image received by the pair of reflective surfaces 13, 14 is projected through the lens 16 and onto the film 18 at position 21 so that two images are provided side-by-side on the film 18. The film 18 is angled so that at position 20, 21 it is at a right angle to the respective axes of the two lenses 15 and 16. The film 18 is processed in a conventional manner so as to produce negatives or slides and the printed pictures or slides are ready for viewing in a viewer without having to be aligned or re-mounted. Thus a conventional film 18 can be used for producing stereographs. The lenses 15 and 16 can be simple or compound lenses. Some of the reflective surfaces 11, 12, 13, 14 may be curved to act as a lens A further improvement in wide angle effect is possible by the use of retro-focus lenses as shown in FIGS. 2 and 3. These lenses have a positive lens 21 at the back and a negative lens 22 in front as shown in FIG. 2. The beam splitter unit 10 can be located between the lenses 21 and 22 as shown in FIG. 3 or behind the lens 21. By introducing the beam splitter 10 in between such a retro-focus lens provides a wide angle view with a compact beam splitter. FIG. 3 shows a half beam splitter 10.

Figure 4:
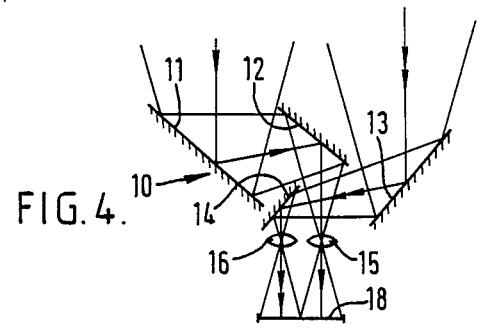
FIG. 4 shows the beam splitter with twin lens.

FIG. 4 shows a beam splitter 10 with an arrangement of reflective surfaces 11 to 14 which are different to those of FIG. 1, again twin lenses 15 and 16 are provided. FIG. 5 shows the beam splitter 10 as in FIG. 1 used with a single lens 23. In FIGS. 4 and 5 the film material 18 can be flat.

FIG. 6 shows the beam splitter 10 as in FIG. 4 combined with retro-focus lenses having front lens 24 and rear lens 26.

FIG. 7 shows a beam splitter 10 provided with two halves 27 and 28 of a diverging lens and which can be attached to a conventional camera 29 so as to project two images side-by-side onto the film. The arrangement enables a simple lens camera to be converted into a stereoscopic camera.

FIG. 8 shows the beam splitter 10 combined with long lens focus lenses (telescopic). In this case the beam splitter 10 has a wide base.

It will be appreciated that many modifications and changes can be made without departing from the scope of the appended claims.

I, therefore particularly point out and distinctly claim as my invention:

1. A photographic imaging system for use in a stereographic camera for producing stereographs of a scene being viewed, the photographic imaging system comprising:

a first set of reflective surfaces for directing light emanating from a scene being viewed along a first optical path;

a second set of reflective surfaces for directing light emanating from a scene being viewed along a second optical path;

holding means for holding a single frame of film and for bending the single frame of film along a bend to form a first portion of film and a second portion of film disposed on opposite sides of the bend, said first optical path being substantially perpendicular to said first portion of film and said second optical path being substantially perpendicular to said second portion of film;

a first lens disposed along said first optical path for forming a first image on the first portion of film; and a second lens disposed along said second optical path for forming a second image on the second portion of film, the first and second images being formed side-by-side on the film and the first and second optical paths crossing between the first and second lenses and the holding means.

2. A photographic imaging system for use in a stereographic camera as claimed in claim 1, wherein said first and second sets of reflective surfaces include a pair of reflective surfaces.

3. A photographic imaging system for use in a stereographic camera as claimed in claim 1, wherein the first lens is disposed between the first set of reflective surfaces and the holding means and the second lens is disposed between the second set of reflective surfaces and the holding means.

4. A photographic imaging system for use in a sterographic camera as claimed in claim 1 wherein said second optical path emanates from the scene being viewed at a desired angle of divergence from the first optical path.

5. A photographic imaging system for use in a stereographic camera as claimed in claim 1, further including an aperture disposed between the first and second lenses and the first and second portions of film, respectively, wherein light emanating from the first lens and passing through the aperture falls incident only on the first portion and light emanating from the second lens and passing through the aperture falls incident only on the second portion.

6. A photographic imaging system for use in a stereographic camera as claimed in claim 1 wherein said first and second portions of film define a desired angle therebetween.

7. A photographic imaging system for use in a stereographic camera as claimed in claim 6 wherein said desired angle is an obtuse angle.

* * * * *